Dec. 4, 1962    R. J. SULLIVAN    3,066,805
REMOTE CONTROL FOR MANIPULATORS
Filed Sept. 19, 1958    2 Sheets-Sheet 1
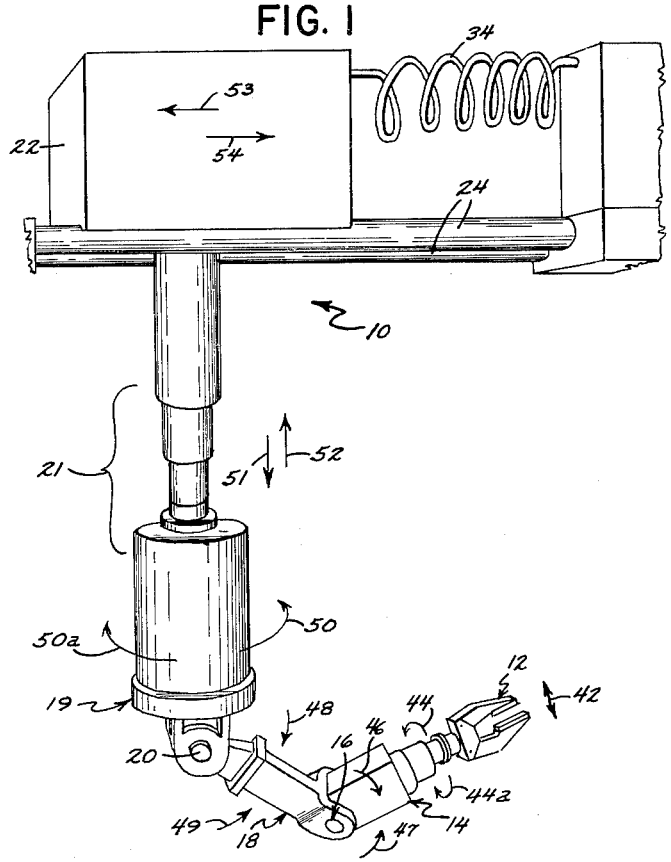
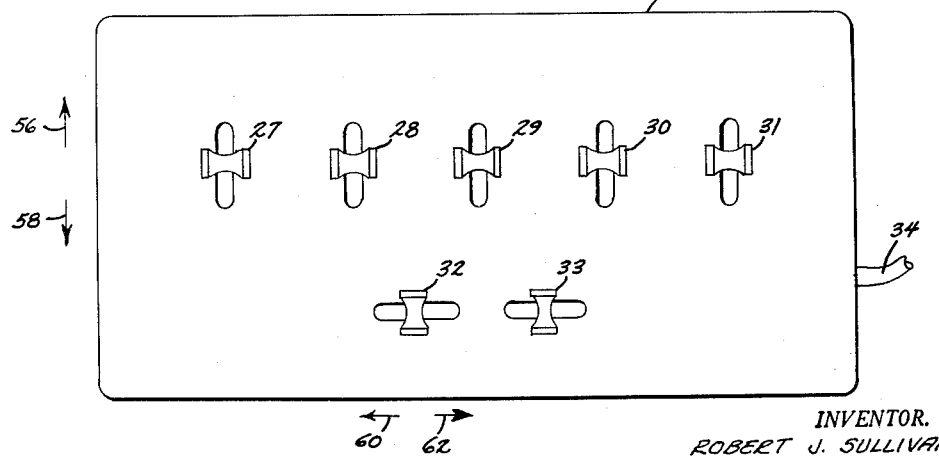
INVENTOR.
ROBERT J. SULLIVAN
BY
William C. Babcock
ATTORNEY Dec. 4, 1962  R. J. SULLIVAN  3,066,805
REMOTE CONTROL FOR MANIPULATORS
Filed Sept. 19, 1958  2 Sheets-Sheet 2
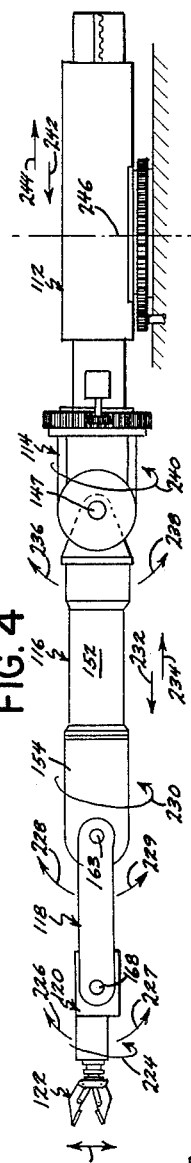
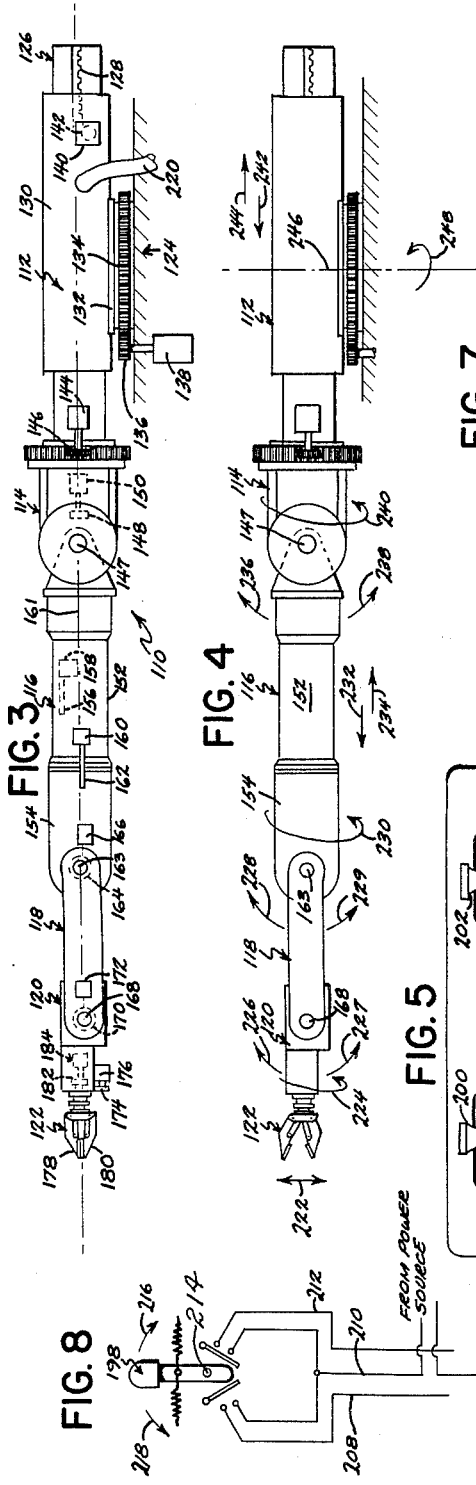
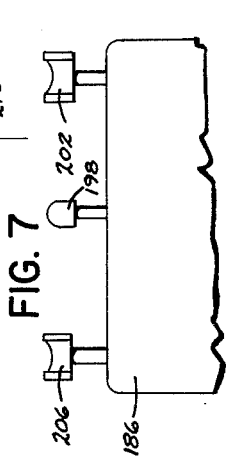
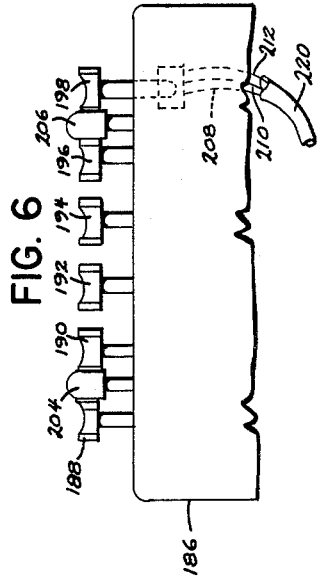
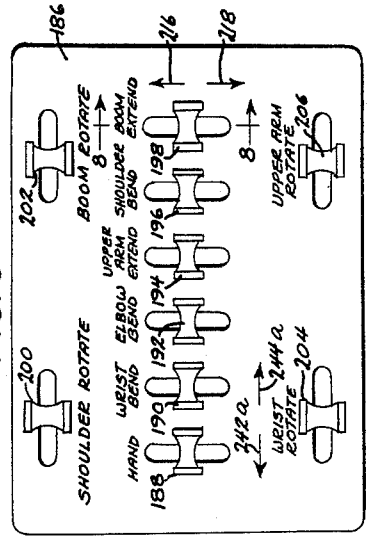
INVENTOR.
ROBERT J. SULLIVAN
BY
William C. Babcock
ATTORNEY

United States Patent Office 3,066,805
Patented Dec. 4, 1962

3,066,805
REMOTE CONTROL FOR MANIPULATORS
Robert J. Sullivan, Minneapolis, Minn., assignor to General Mills, Inc., a corporation of Delaware
Filed Sept. 19, 1958, Ser. No. 762,117
16 Claims. (Cl. 214—1)

The present invention relates to improvements in controls. More particularly, it pertains to control units for regulating the numerous possible motions of a remotely controlled articulated work unit, parts of which duplicate certain movements of the human arm.

One such manipulator currently in use includes a shoulder member or support which can be extended longitudinally (e.g. vertically) and rotated coaxially on the axis of longitudinal extension. An upper arm is pivoted to the shoulder support for pivotal or bending movement on an axis transverse to both said arm and said axis of extension. A forearm or hand member is pivoted to said upper arm for similar bending movement like an elbow joint, and the forearm or hand member may also be mounted for coaxial rotation, e.g. wrist rotation. A further wrist bending movement on a transverse axis, is sometimes also provided.

Accordingly, one object of this invention is to provide a control unit for individually regulating a multiplicity of bending, extending and rotating movements of a remotely controlled articulated work unit.

A further object of this invention is to provide a control box for individually and conveniently regulating each bending, extending and rotating movement of a remotely controlled articulated work unit when said unit bends, extends and rotates in a plurality of different locations.

Another object is to provide a control unit in which movable control members which regulate the various bending, extending, and coaxially rotating motions of elements of a remotely controlled articulated work unit are conveniently oriented so that the movements of the control members which regulate said various bending and extending motions are readily distinguished from the movements of the control members which regulate said rotating motions.

A further object is such a control panel in which at least one control member which regulates a coaxially rotating motion is movable transversely of the panel and in which a plurality of control members for other types of motion are movable longitudinally of the panel.

Another object is to provide a control unit in which the relative movements of the control switches mounted thereon are oriented to correspond at least in part to the actual relative movements of the remotely controlled articulated work units regulated thereby.

Other objects and advantages of the invention will be apparent from the following description in which certain preferred embodiments of the invention are disclosed. In the drawings which form a part of this application, FIGURE 1 is a perspective view of a known type of manipulator which may be combined with a control unit according to the present invention.

FIG. 2 is a top view of a control unit or panel for the device of FIG. 1;

FIG. 3 is a side elevational view of a more complex remotely controlled articulated work unit which may also be controlled according to the present invention;

FIG. 4 is a side elevational view of the work unit shown in FIG. 3 with arrows denoting the various ways different parts of said unit move;

FIG. 5 is a top view of a control unit or box showing a preferred orientation of various control switches for regulation of movements of the remotely controlled work unit shown in FIG. 3;

FIG. 6 is a front view of the control box shown in FIG. 5;

FIG. 7 is a side view of the control box shown in FIG. 5; and

FIG. 8 is a cross sectional view of control box switch 198 shown in FIG. 5 taken along the line 8—8.

FIGURE 1 is a perspective view of a known type of remote controlled articulated work or handling unit 10. The handling unit 10 comprises a hand 12, a forearm 14, an elbow joint 16, an upper arm 18, a shoulder 19, a shoulder joint 20, an extensible shoulder support 21 and a shoulder positioning member 22. The shoulder positioning member 22 may be mounted on a pair of tracks 24. The various parts of handling unit 10 are linked together as disclosed in a co-pending application, Serial No. 736,285 of which Charles H. Bergsland and Robert S. Hedin are the applicants, now Patent 2,861,701.

FIGURE 2 is a top view of a control unit or box 26 used to regulate the various movements of the remotely controlled handling unit 10. The control box 26 comprises control members or switches 27, 28, 29, 30, 31, 32, and 33 which are similar in detail and operation to a control member 198 shown sectionally and described in further detail in connection with FIG. 8. Three electric wires like wires 208, 210 and 212 of FIG. 8 are associated with each individual control member 27, 28, 29, 30, 31, 32, and 33. These wires all pass through conduit or cable 34 to the shoulder positioning member 22. The three wires associated with each individual control member 27, 28, 29, 30, 31, 32 and 33 are connected to individual electric motors. These motors which are omitted from FIG. 1 for convenience are positioned in the handling unit 10 in known manner for actuating the various elements of said unit.

The elements which make up handling unit 10 move as shown by arrows 42, 44, 44a, 46, 47, 48, 49, 50, 50a, 51, 52, 53, and 54. The various electric motors, and appropriate gears and other connections necessary to enable a handling unit such as 10 to perform these movements are disclosed in detail in said co-pending application, Serial No. 736,285 of Bergsland and Hedin, now Patent 2,861,701.

The regulation of these movements represented by arrows 42, 44, 44a, 46, 47, 48, 49, 50, 50a, 51, 52, 53, and 54 is accomplished by the proper movement of the control members 27—33. When control member 27 is moved in the direction indicated by arrow 56 to its forward operating position, the hand motor is actuated to open the hand 12 as indicated by the arrows 42. When the control member 27 is moved in the direction of arrow 58 to its rear operating position, the hand motor is actuated in the reverse direction and hand 12 closes.

Movement of the switch 28 in the direction of the arrow 56 to its forward operating position actuates the forearm motor to swing forearm 14 about elbow joint 16 in the direction shown by the arrow 46. Moving the member 28 in the direction of arrow 58 to its rear operating position reverses the forearm motor, so forearm 14 swings about elbow joint 16 in the direction of the arrow 47.

Moving control member 29 in the direction of the arrow 56 to its forward operating position energizes the shoulder motor and causes upper arm 18 to swing about shoulder joint 20 in the direction indicated by arrow 48. When switch 29 is moved in the direction shown by arrow 58 to its rear operating position, the shoulder motor is reversed and causes the upper arm 18 to swing in the opposite direction as indicated by arrow 49.

When control member 30 is moved in the direction of the arrow 56 to its forward operating position, the shoulder support extension motor is actuated and moves shoulder 19 in the direction indicated by the arrow 51. When control member 30 is moved in the direction of the arrow 58 to its rear operating position, the shoulder support extension motor drives the shoulder 19 in the direction of arrow 52. Thus the extension and contraction of extensible shoulder support member 21 is regulated by switch 30.

Control member 31 when moved in the direction of the arrow 56 to its forward operating position energizes the horizontal position control motor which in turn drives shoulder support member 22 in the direction of the arrow 53. Moving control member 31 in the direction of arrow 56 to its rear operating position causes said horizontal position control motor to drive said member 22 in the direction of arrow 54. Thus the control members for all of the movements which lie in a plane containing one or more of the arms or members of the work unit, i.e. the swinging and the extending and contracting and translating movements, are oriented for operating movement in parallel planes.

With reference to the control of axial rotations of the members when switch 32 is moved to its left operating position by movement in the direction of arrow 60 (i.e. counterclockwise as viewed from the rear to the front of unit 26) it energizes the wrist motor which causes hand 12 to rotate in a counterclockwise direction (as one looks out along the arm toward the end of the hand) as indicated by arrow 44. Moving switch 32 in the direction of arrow 62 to its right operating position (i.e. clockwise as viewed by an operator located behind the control unit) causes the hand 12 to rotate in the opposite direction, i.e. clockwise, as defined above, as shown by arrow 44a.

Movement of switch 33 in the direction of arrow 60 to its left or counterclockwise operating position energizes the shoulder rotation motor which causes the member 19 to rotate counterclockwise (again viewed looking outwardly from the tracks 24 toward the shoulder joint 20), as indicated by arrow 50. Placing control member 33 in its right or clockwise operating position by moving it as shown by arrow 62, causes the shoulder rotation motor to rotate the shoulder 19 clockwise as depicted by arrow 50a. Thus all of the axial relative rotational movements, i.e. those coaxial with an arm or supporting member, are controlled by movements of control levers transversely of the parallel planes along which the other control members are moved.

Thus the control unit or box 26 makes it possible to easily distinguish and regulate different types of movements of a remotely controlled articulated handling unit 10. Movements are in the plane of arms, elements or supporting tracks of said unit 10, i.e., the bending or swinging and extending movements 46, 47, 48, 49, 51, 52, 53 and 54 are controlled by switch or control members movable in parallel planes toward or away from the operator. The rotational movements which are about the longitudinal axes of various arms or supporting members, i.e., the rotation movements 44, 44a, 50 and 50a are controlled by switches movable transversely in front of the operator and in the same relative direction of rotation as the desired movement of the work unit 10.

Thus the control box has control members with movements closely resembling the movements of the parts of the remote control handling unit which they regulate.

FIGURES 3 through 8 show the application of certain features of the present invention in connection with another remotely controlled articulated work unit 110, which has additional movements to be controlled. The remotely controlled articulated work unit 110 is mounted on a support 124 and comprises a boom member 112, a shoulder member 114, an upper arm member 116, a forearm member 118, a wrist member 120, and a hand member 122.

The boom member 112 comprises a boom support 130 and a boom 126 on which is mounted a boom rack 128. The boom support 130 is fastened to a circular cradle member or turret 132 which in turn is secured to a ring gear 134 and is mounted for rotation around the vertical axis of the circular cradle. A drive pinion 136 enmeshes the teeth of the ring gear 134 and is driven by a motor 138 on the support 124 to rotate the cradle and work unit on said vertical axis. Fixedly attached to the boom support 130 is a motor 140 which drives a gear member 142 which engages the teeth of boom rack 128 to extend and retract the boom 126 along its longitudinal axis.

At one end of the boom member 112 is situated a shoulder member 114, which is mounted for rotation coaxially of the longitudinal axis of the boom. The shoulder member 114 is rotated by a motor 144 through gears 146.

By means of a shaft 147 the shoulder member 114 is pivotally connected to the upper arm member 116 for relative swinging movement on the transverse axis established by said shaft. Through gears 148 a motor 150 is connected to cause the desired swinging movement.

The upper arm 116 is comprised of a first section 152 and a second section 154. Through gears 156 which are driven by a motor 158 the sections 152 and 154 are telescopically moved with respect to each other, i.e., the upper arm 116 is extended or contracted in length. A motor 160 connected to section 152 operates through gears 162 to rotate section 154 about the longitudinal axis 161 of the remotely controlled articulated work unit as shown in FIG. 3.

Consequently, the upper arm member 116 is pivotal about the shoulder shaft 147, i.e., it can swing or bend about the shaft 147, and at the same time the two sections 152 and 154 constituting said upper arm are extensible along and rotatable about the longitudinal axis 161 of this upper arm.

The next member to be described is the forearm member labeled 118. The forearm is pivotal about a transverse axis or shaft 163 which is perpendicular to the longitudinal axis 161 of the upper arm member. The actual pivoting movement is achieved by a set of gears 164 which is actuated by a motor 166. The motor 166 is fixedly located on the second section 154 of the upper arm member 116.

While one end of the forearm 118 is pivotally connected to one end of the upper arm member 116 as described above, the opposite end of the forearm 118 pivotally carries the wrist member 120. To swing the wrist member 120 relative to the forearm 118 a transverse shaft 168 is provided. The shaft 168 has integral therewith a gear 170 which is driven by a motor 172. The motor 172 is mounted directly on the forearm member 118.

The wrist member 120 carries a hand mechanism, denoted by reference numeral 122, which is mounted for rotation on the longitudinal axis of the hand, e.g., wrist rotation. To cause rotation of the hand mechanism 122 about its own longitudinal axis, gears 174 are disposed along the wrist member 120. The gears 174 are driven by a motor 176 which is also located on the wrist member 120.

The hand 122 includes a pair of relatively moveable jaw elements 178 and 180. These jaw elements 178 and 180 are actuated by a reciprocal plunger 182 extending into the cylindrical portion of the wrist member 120. The reciprocal plunger 182 is advanced or retracted by means of suitable connections to a motor 184 mounted by the cylindrical portion of said wrist member.

Any suitable mechanisms may be used for driving the different elements of the work unit from their motors, and the driving connections suggested above are merely illustrative. Further details of suitable driving arrangements are illustrated, for example in the previously mentioned copending application of Bergsland et al., Serial No. 736,285 filed May 19, 1958 for Remote Controlled Handling Unit, now Patent 2,861,701, and in the further co-pending applications of T. R. James, Serial No. 243,705 filed August 25, 1951 for Remote Control Manipulator, now Patent 2,861,700 and of A. H. Youmans, Serial No. 190,387 filed October 16, 1950 for Method and Apparatus for Performing Operations at a Remote Point, now Patent 2,861,699. Certain features shown to illustrate one use of the present invention, but not claimed herein, are further disclosed and claimed in the co-pending application, Serial Number 762,143, of D. F. Melton, filed of even date herewith, i.e., September 19, 1958, for Vehicle Mounted Manipulator. All of the above applications are assigned to the assignee of the present invention.

FIG. 5 shows the application of the control unit features of the present invention to the work unit of FIGS. 3 and 4. Numeral 186 depicts a control box having mounted thereon control switches 188, 190, 192, 194, 196, 198, 200, 202, 204, and 206. These control switches all have at least three operating positions and are connected individually by suitable wires to motors 184, 172, 166, 158, 150, 140, 144, 138, 176, and 160 respectively.

FIG. 8 which is a cross sectional view of the control switch 198 shows three electric conductors 208, 210, and 212 associated therewith. Switch 198 pivots about point 214. In its normal upright position switch 198 maintains the circuit to its associated motor 140 opened. Switch 198 is spring actuated to return to its normal upright position whenever any external pressure exerted thereon is released. Such switches are well known in the art and will therefore not be described in detail here.

The three electric wires 208, 210, and 212 associated with switch 198 are passed through a conduit 220 connected to the control box 186 (see FIG. 6). This conduit 220 is fastened to the boom support 130 (see FIG. 3). The wires 208, 210, and 212 continue out from the conduit 220 and are fastened to the motor 140. Similarly three wires like 208, 210, and 212 are associated with each control switch 188, 190, 192, 194, 196, 200, 202, 204, and 206 and passed through said conduit 220 and connected to the motors 184, 172, 166, 158, 150, 144, 138, 176, and 160 respectively.

According to the present inventions the desired objects can be accomplished by orientating the control switches on a panel so that the movements of those switches which regulate the extending and bending or swinging motions of the remotely controlled articulated work unit are in parallel planes and the movements of any control switches which regulate any rotating motions of said unit lie in planes transverse to said parallel planes. The ensuing paragraphs on the operation of the invention herein disclosed point out the advantage of such a control box.

The various movements of the remotely controlled articulated work unit 110 are shown by the arrows 222, 224, 226, 227, 228, 229, 230, 232, 234, 236, 238, 240, 242, 244 and 248. Each of these movements is controlled by one of the control switches 188, 190, 192, 194, 196, 198, 200, 202, 204 and 206 of the control box 186. All of said switches have at least three operating positions and operate their associated motor the same way as switch 198 does.

More specifically, when switch 198 is moved forward, i.e. in the direction indicated by arrow 216, it closes the circuit between the electric conductors 208 and 210. Current then flows through the motor 140 and said motor operates in one direction. When switch 198 is moved backwards, i.e. in the direction indicated by arrow 218 it closes the circuit between the electric conductors 210 and 212. Current then flows through said motor 140 so that it operates in a reverse direction. Changing the position of the switch 198 from its forward operating position, i.e. when the electrical circuit between conductors 208 and 210 is closed, to its rearward position, i.e. when the electrical circuit between the conductors 210 and 212 is closed, reverses the direction of current flow to motor 140. Said reversal of current reverses said motor. Since the reversal of motors by changing the direction of current flow through the coils thereof is well known in the art it will not be discussed in detail in this application.

The opening and closing of the jaws 178 and 180 of the hand member 122 is regulated by the control switch 188. When the control switch 188 is moved in the direction of arrow 216 to its forward operating position current flows to the motor 184 and the jaws close. When the switch 188 is moved in the direction of arrow 218 to its rear operating position said current reverses and said jaws open. When the switch 188 returns to its normal centered position no current flows to motor 184 and said jaws stop moving.

The switch 190 controls the swinging or bending movement of the wrist 120 about the pivotal connecting shaft 168. When switch 190 is moved in the direction of arrow 216 to its forward operating position current flows to the motor 172 and the wrist 120 will move in the direction of arrow 226. When switch 190 is moved in the direction of arrow 218 to its rear operating position the current flow to the motor 172 is reversed and the wrist member 120 bends about the pivotal axis 168 in the direction shown by arrow 227. The rotation of the hand member 122 about the longitudinal axis 161 is controlled by switch 204. When switch 204 is moved in the direction of arrow 242a to its left operating position current flows to the motor 176 and the hand member 122 will rotate about its longitudinal axis 161 in a counterclockwise direction. Moving switch 204 in the direction indicated by arrow 244a to its right operating position reverses the current flow to the motor 176 and the hand 122 rotates in a clockwise direction.

The bending or swinging movement of the forearm 118 about the shaft 163 is controlled by switch 192. Movement of switch 192 in the direction of arrow 216 to its forward operating position actuates the motor 166 so that it drives gears 164 to move the forearm 118 in the direction indicated by arrow 228. Movement of switch 192 in the direction of arrow 218 to its rear operating position actuates the motor 166 in a reverse direction so that the forearm 118 will move about pivotal connection shaft 163 in the direction indicated by the arrow 229.

The rotation of section 154 of the upper arm 116 about the longitudinal axis 161 is controlled by switch 206. Placing switch 206 in its left operating position by moving it in the direction of arrow 242a actuates motor 160 so that section 154 rotates in a counterclockwise direction as shown by arrow 230. When switch 206 is placed in its right operative position by moving it in the direction of arrow 244a, it actuates motor 160 in the reverse direction and thereby rotates section 154 in a clockwise direction.

Switch 194 controls the extending and contracting of upper arm member 116. When switch 194 is moved in the direction indicated by arrow 216 to its forward operating position current flows to the motor 158 and the section 154 of said upper arm 116 moves in the direction of arrow 232. When the switch 194 is moved in the direction indicated by arrow 218 to its rear operating position the current flow to the motor 158 is reversed and the motor 158 is actuated to move section 154 in the direction of the arrow 234.

Switch 196 regulates the bending or swinging movement of the upper arm 116 about pivotal axis or shaft 147. Movement of switch 196 in the direction indicated by arrow 216 to its forward operating position causes current to flow to the motor 150 so that the upper arm 116 is driven in the direction of arrow 236. Movement of switch 196 in the direction of arrow 218 to its rear operating position reverses motor 150 so that upper arm 116 will then move in the direction indicated by arrow 238.

The rotation of shoulder member 114 about the longitudinal axis 161 of the remotely controlled articulated work unit 110 is controlled by the switch 200. Switch 200 when moved to its left operating position causes current to flow which activates the motor 144 to drive shoulder member 114 in a counterclockwise direction as shown by arrow 240. When switch 200 is moved to its right operating position by moving said switch in the direction indicated by arrow 244a, the current flow reverses and the motor 144 drives the shoulder member 114 in a clockwise direction.

The movement of the boom 126 relative to the boom support 130 is controlled by switch 198. When switch 198 is moved to its forward operating position by moving it in the direction indicated by arrow 216 current flows to the motor 140. Motor 140 moves the boom 126 in the direction indicated by arrow 242. When the switch 198 is moved to its rear operating position by being moved in the direction indicated by arrow 218 the current to the motor 140 reverses and the motor 140 runs in a reverse direction. Therefore the boom 146 moves in the direction indicated by arrow 244.

Switch 202 when moved in the direction indicated by arrow 242a to its left operating position causes current to actuate the motor 138 so that the boom member 112 rotates about the axis 246 in a counterclockwise direction as indicated by arrow 248. When switch 202 is placed in its right operating position by being moved in the direction indicated by arrow 244a, the motor 140 is actuated to rotate the boom member 112 in a clockwise direction about said axis 246.

It will be appreciated that there are many combinations of movements by which the hand 122 can be positioned so as to either grab or release an object at a predetermined point. Likewise an object held by said hand can be twisted or turned by rotating any of a number of parts which make up the remotely controlled articulated work unit.

The novel orientation of the control switches as disclosed herein permit a correlation between the switch movements and the various movements of a remotely controlled articulated work unit. All movements of the work unit away from and toward an operator are controlled by switches which move away from and toward the operator while the clockwise and counterclockwise rotational movements of said units are controlled by switches whose movements resemble said clockwise and counterclockwise movements.

Such an arrangement enables the operator to easily control the movements of the remotely controlled unit, since as the operator watches the unit he can, by moving certain switches away from himself, move the hand 122 away from himself, by moving some of the same switches toward himself bring the hand 122 closer to himself, my moving other switches clockwise rotate particular parts of said unit clockwise, and by moving said other switches counterclockwise rotate said particular parts of said unit counterclockwise.

Although the preferred embodiment of the invention disclosed herein refers to electrical equipment for obtaining correlation between the various movements of the articulated work unit and the various movements of the control members of the control unit, said correlation can be accomplished by other types of equipment, e.g. hydraulic equipment or air motors.

In view of the principles set forth herein, I have shown some of the ways of carrying out the present invention and some of the equivalents which are suggested by these disclosures.

Now, therefore, I claim:

1. An apparatus for controlling the numerous possible motions of a remote control manipulator having a plurality of connected parts, two of said parts being relatively coaxially rotatable about a longitudinal axis of one of said parts, and two of said parts connected for relative swinging motion about an axis transverse to the longitudinal axes of said parts, said apparatus comprising a control unit having a panel, a first movable control member carried by said unit and extending generally upwardly from said panel, said first member having its movements in a first plane, said first control member movements regulating said swinging of said manipulator parts, and at least one second control member carried by said unit and extending generally upwardly from said panel, said second member being spaced from said first member for movement along a path extending transversely of said first plane, said second control member movement regulating said coaxial rotation.

2. Apparatus according to claim 1 in which the movements of said first control member are along a path extending toward and away from the normal position of an operator adjacent said control unit, and in which the movement of said second control member is along a path extending transversely across in front of such an operator.

3. An apparatus for controlling the numerous possible motions of a remote control manipulator having a plurality of connected parts, two of said parts being relatively coaxially rotatable about a longitudinal axis of one of said parts, and one of said parts having means for extension and contraction of its effective length which comprises a control unit having a panel, a first movable control member carried by said unit and extending generally upwardly from said panel, said first member having its movements in a first plane, said first control member movements regulating said extension and contraction, and at least one second control member carried on said unit and extending generally upwardly from said panel, said second member being spaced from said first member for movement along a path extending transversely of said first plane, said second control member movement regulating said coaxial rotation.

4. Apparatus according to claim 3 in which the movements of said first control member are along a path extending toward or away from the normal position of an operator adjacent said control unit, and in which the movement of said second control member is in the same direction as the direction of said coaxial rotation.

5. An apparatus for controlling the numerous possible motions of a remote control manipulator having a plurality of connected parts, two of said parts being relatively coaxially rotatable about a longitudinal axis of one of said parts, one of said parts having means for extension and contraction of its effective length, and two of said parts connected for relative swinging motion about an axis transverse to the longitudinal axes of said parts, said apparatus comprising a control unit having a panel member, a plurality of first movable control members carried by said unit and extending generally upwardly from said panel, said first control members having their movements in parallel planes, said first control member movements regulating said swinging and said extension and contraction of said manipulator parts, and at least one second control member carried on said unit and extending generally upwardly from said panel, said second member being spaced from said first member for movement along a path extending transversely of said parallel planes, said second control member movement regulating said coaxial rotation.

6. Apparatus according to claim 5 in which the movements of all of said first control members are along paths in parallel planes extending toward and away from the normal position of an operator adjacent said control unit, and in which the movement of said second control member is along a path extending transversely across said parallel planes and in front of such an operator.

7. An apparatus for controlling the various motions of a remotely controlled articulated handling unit having a plurality of members connected together to provide axial relative rotation between certain of said handling unit members and adjustment of the distance between parts of said handling unit members, said apparatus comprising a panel, a first plurality of control members carried by said unit and extending generally upwardly from said panel, said members having their motions in parallel planes, said control members regulating the distance between said parts of said handling unit members, and at least one other control member carried by said unit and extending generally upwardly from said panel, said one other control member being spaced from said first members and having its movement in a plane transverse of said parallel planes, said one other control member regulating said relative rotation.

8. An apparatus for controlling the numerous possible motions of a remotely controlled articulated handling unit having a plurality of connected component parts, one of said parts being connected to swing about an axis transverse to the longitudinal axis of said one part, one of said parts being rotatable about its longitudinal axis, and one of said parts being extensible which comprises a panel, a first plurality of switches extending generally upwardly from said panel, said first switches having parallel movements, said first switch movements regulating the movement of said part about said transverse axis and the extension of said arm, and at least one second switch extending generally upwardly from said panel, said second switch being spaced from said first switch and having its movement transverse to said parallel planes, said second switch movement regulating the rotation of said one part which is rotatable about its longitudinal axis.

9. An apparatus for controlling the motions of a remotely controlled articulated work unit having a plurality of connected parts, at least two of said parts connected to bend about an axis transverse to the plane of said unit, one of said parts being extensible, and one of said parts being rotatable about its longitudinal axis which comprises a first movable switch for regulating said bending, a second movable switch for regulating said extending, and a third movable switch for regulating said rotating, said first and second switches having their movements in parallel planes and said third switch having its movement transverse to that of said parallel planes.

10. An apparatus for controlling the motions of a remotely controlled articulated work unit having a plurality of connected parts, at least two of said parts connected to bend about an axis perpendicular to the plane of said unit, one of said parts being extensible, and one of said parts being rotatable about its longitudinal axis which comprises a first movable switch for regulating said bending, a second movable switch for regulating said extending, and a third movable switch for regulating said rotating, said first and second switches having their movements in parallel planes and said third switch having its movement perpendicular to that of said parallel planes.

11. An apparatus for controlling the numerous possible motions of a remotely controlled handling unit having a hand which opens and closes, a wrist which rotates about a first longitudinal axis and swings about an axis transverse of said first longitudinal axis, a forearm which swings about an axis, an upper arm which rotates about a second longitudinal axis and swings about an axis transverse of said second longitudinal axis, said upper arm being extensible, a boom having at least a portion thereof which rotates about a third longitudinal axis, said boom being extensible and capable of rotating about an axis transverse of said third longitudinal axis which comprises a panel, a first plurality of switches mounted on said panel, said first switches having their movements in parallel planes and a second plurality of switches mounted on said panel, said second switches being spaced from said first switches and having their movements transverse to said parallel planes.

12. An apparatus for controlling the numerous possible motions of a remotely controlled handling unit having a hand which opens and closes, a wrist which rotates about a first longitudinal axis and swings about an axis transverse of said first longitudinal axis, a forearm which swings about an axis, an upper arm which rotates about a second longitudinal axis and swings about an axis transverse of said second longitudinal axis, said upper arm being extensible, a boom having at least a portion thereof which rotates about a third longitudinal axis, said boom being extensible and capable of rotating about an axis transverse of said third longitudinal axis which comprises a panel, a first plurality of control members on said panel and having their movements in parallel planes, said first control member movements regulating the extension and contraction of said unit, and a second plurality of control members on said panel, said second members being spaced from said first members and having their movements transverse to said parallel planes, said second control member movements regulating the rotation of portions of said unit about said longitudinal axis.

13. An apparatus for controlling the numerous possible motions of a remotely controlled handling unit having a hand which opens and closes, a wrist which rotates about a first longitudinal axis and swings about an axis transverse of said first longitudinal axis, a forearm which swings about an axis, an upper arm which rotates about a second longitudinal axis and swings about an axis transverse of said second longitudinal axis, said upper arm being extensible, a boom having at least a portion thereof which rotates about a third longitudinal axis, said boom being extensible and capable of rotating about an axis transverse of said third longitudinal axis which comprises a first plurality of control members having their movements in parallel planes, one of said first control member movements regulating the swings about said transverse axes, another of said first control members regulating the extension and contraction of said unit, and a second plurality of control members spaced from said first members and having their movements transverse to said parallel planes, one of said second control member movements regulating the rotation of portions of said unit about said longitudinal axis.

14. An apparatus for controlling the numerous possible motions of a remotely controlled handling unit having a hand which opens and closes, a wrist which rotates about a first longitudinal axis and swings about an axis transverse of said first longitudinal axis, a forearm which swings about an axis, an upper arm which rotates about a second longitudinal axis and swings about an axis transverse of said second longitudinal axis, said upper arm being extensible, a boom having at least a portion thereof which rotates about a third longitudinal axis, said boom being extensible and capable of rotating about an axis transverse of said third longitudinal axis which comprises a first plurality of control members having their movements in parallel planes, one of said first control member movements regulating the opening and closing of said hand, another of said first control members regulating the extension and contraction of said unit, and a second plurality of control members having their movements transverse to said parallel planes, one of said second control member movements regulating the rotation of portions of said unit about said longitudinal axis.

15. An apparatus for controlling the numerous possible motions of a remotely controlled handling unit having a hand which opens and closes, a wrist which rotates about a first longitudinal axis and swings about an axis transverse of said first longitudinal axis, a forearm which swings about an axis, an upper arm which rotates about a second longitudinal axis and swings about an axis transverse of said second longitudinal axis, said upper arm being extensible, a boom having at least a portion thereof which rotates about a third longitudinal axis, said boom being extensible and capable of rotating about an axis transverse of said third longitudinal axis which comprises a first switch having longitudinal movement which regulates the opening and closing of said hand, a second switch having longitudinal movement which regulates one of the swings about one of said transverse axes, a third switch having longitudinal movement which regulates the extension of one of said extending elements of said unit, said first, second and third longitudinal movements being in parallel planes, a fourth switch having transverse movement which regulates one of said rotations, and a fifth switch having transverse movement which regulates another of one of said rotations.

16. An apparatus according to claim 15 in which the transverse movements of switches four and five are perpendicular to said parallel planes.

References Cited in the file of this patent

UNITED STATES PATENTS

| | | |
|---|---|---|
| 2,391,881 | Clay | Jan. 1, 1946 |
| 2,822,094 | Greer | Feb. 4, 1958 |
| 2,861,699 | Youmans | Nov. 25, 1958 |